(12) United States Patent
Hunter et al.

(10) Patent No.: US 6,758,032 B2
(45) Date of Patent: Jul. 6, 2004

(54) SYSTEM OF PULSED DETONATION INJECTION FOR FLUID FLOW CONTROL OF INLETS, NOZZLES, AND LIFT FANS

(75) Inventors: Louis G. Hunter, Fort Worth, TX (US); Daniel N. Miller, Fort Worth, TX (US); Paul E. Hagseth, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 126 days.

(21) Appl. No.: 10/072,690

(22) Filed: Feb. 7, 2002

(65) Prior Publication Data

US 2003/0145577 A1 Aug. 7, 2003

(51) Int. Cl.⁷ .................................................. F02K 1/30
(52) U.S. Cl. ........................ 60/231; 60/242; 239/265.23
(58) Field of Search .......................... 60/228, 231, 242; 239/265.17, 265.23

(56) References Cited

U.S. PATENT DOCUMENTS

| | | | | |
|---|---|---|---|---|
| 3,204,405 A | * | 9/1965 | Warren et al. ................. | 60/231 |
| 3,278,140 A | * | 10/1966 | Evans .......................... | 60/231 |
| 3,353,356 A | * | 11/1967 | Williams ...................... | 60/231 |
| 4,077,572 A | * | 3/1978 | Fitzgerald .............. | 239/265.17 |
| 4,351,479 A | * | 9/1982 | Kranz et al. ........... | 239/265.23 |
| 5,473,885 A | | 12/1995 | Hunter, Jr. et al. ........... | 60/204 |
| 5,579,633 A | | 12/1996 | Hunter, Jr. et al. ........... | 60/204 |
| 6,112,512 A | * | 9/2000 | Miller et al. .................. | 60/231 |
| 6,112,513 A | | 9/2000 | Catt et al. ..................... | 60/204 |

FOREIGN PATENT DOCUMENTS

EP    1158156 A2    11/2001

OTHER PUBLICATIONS

Notification of Transmittal of International Search Report, Application No. PCT/US03/02286, filed Jan. 23, 2003, referencing the above EP Foreign Patent Document, Oct. 23, 2003.

* cited by examiner

Primary Examiner—Michael Koczo
(74) Attorney, Agent, or Firm—Baker Botts L.L.P.

(57) ABSTRACT

According to one embodiment of the invention, a system for altering a fluid flow includes a nozzle having a fluid flow and including a converging portion, a diverging portion downstream of the converging portion, and a throat coupling the converging portion to the diverging portion, at least one port located in a wall of the nozzle and angled with respect to the fluid flow, and at least one pulse detonation device operable to inject a plurality of detonation waves in a pulsed manner through the port and into the fluid flow. The pulsed detonation waves operate to alter the fluid flow.

24 Claims, 3 Drawing Sheets

SYSTEM OF PULSED DETONATION INJECTION FOR FLUID FLOW CONTROL OF INLETS, NOZZLES, AND LIFT FANS

TECHNICAL FIELD OF THE INVENTION

The present invention relates generally to the field of fluid flow control and, more particularly, to a system and method of pulsed detonation injection for fluid flow control of inlets, nozzles, and lift fans.

BACKGROUND OF THE INVENTION

Various aircraft, such as tactical aircraft, have one or more jet engines that produce thrust corresponding to the exhaust coming from a nozzle of the jet engine. The weight and cost of tactical aircraft exhaust systems have increased at an alarming rate with the incorporation of features for afterburning, thrust vectoring, and advanced shaping. Historically, afterburning and vectoring have required variation of the nozzle geometry. For example, a typical turbo fan engine's nozzle throat area must increase in size when afterburning. Vectoring has required deflection of nozzle flaps, and sometimes rotation of the entire nozzle assembly. Aperture shaping for afterbody integration further imposes the use of less structurally efficient two-dimensional, rather than axisymmetric, nozzles. These capabilities require greater mechanical complexity in the various systems.

One way to simplify the nozzle geometry and complexity, while reducing the weight and cost of jet engines and their associated nozzle configurations is to inject a crossflow into the primary flow. For example, U.S. Pat. No. 6,112,512 (the '512 patent) issued to Miller et al., provides a method and apparatus for pulsed injection for improved nozzle flow control. The '512 patent uses engine bleed from the compressor of the jet engine to inject air as a pulsed crossflow into the primary flow in the nozzle. However, bleeding air from the engine takes away mass flow rate of the primary flow, which reduces the thrust and efficiency of the jet engine. Therefore, ways to reduce and amplify compressor bleed air using pulsed detonation devices for controlling the nozzle jet is desired.

Another component associated with a tactical aircraft is a lift fan. Lift fans, which are typically driven by a shaft from a jet engine, produce thrust to aid in lifting of the aircraft. Because of the weight of tactical aircraft, lift fan systems can be very complex and expensive to obtain the required amount of thrust. Therefore, ways to simplify lift fan systems and still produce the required thrust are desired.

SUMMARY OF THE INVENTION

According to one embodiment of the invention, a system for altering a fluid flow includes a nozzle having a fluid flow and including a converging portion, a diverging portion downstream of the converging portion, and a throat coupling the converging portion to the diverging portion, at least one port located in a wall of the nozzle and angled with respect to the fluid flow, and at least one pulse detonation device operable to inject a plurality of detonation waves in a pulsed manner through the port and into the fluid flow. The pulsed detonation waves operate to alter the fluid flow.

According to another embodiment of the invention, a system for altering a fluid flow includes a lift fan shroud having a fluid flow generated by a lift fan, a detonation wave conduit adjacent the lift fan shroud, and a pulse detonation injection device coupled to the detonation wave conduit. The pulse detonation injection device is operable to inject a plurality of detonation waves in a pulsed manner through the detonation wave conduit to combine with the fluid flow to add thrust to the fluid flow.

Embodiments of the invention provide a number of technical advantages. Embodiments of the invention may include all, some, or none of these advantages. In one embodiment, fluid flow through a nozzle is controlled in a manner that allows throttling or vectoring of an engine's thrust by providing pulsed injection of detonation waves. A fixed geometry nozzle may provide a combination of throttling and vectoring functions, depending on the positioning of ports in the wall of the nozzle. The use of pulse detonation injection devices can significantly reduce the weight, cost, and complexity of a jet engine and its associated nozzle. Pulse detonation devices reduce weight by eliminating or limiting the need for durable heavy moving parts, such as hinges, seals, actuators, hydraulics and other mechanical items necessary to open and close the typical iris type variable geometry nozzle. An aircraft equipped with an engine and fixed-geometry nozzle using pulsed detonation injection may also be implemented to non-circular exhaust aperture shapes typical of advanced fighter concepts. Efficiency of an engine is greatly improved since pulsed detonation injection provides pulsed cross flow with reduced or eliminated bleed air from the engine compressor, which can affect the mass flow rate of the primary fluid flow through the engine. An asymmetric cross flow can provide vectoring of an engine's thrust. Thrust vectoring can allow aircraft control of pitch and yaw at all flying speeds, and can decrease the surface area of control surfaces, resulting in reduced aircraft drag and weight.

In another embodiment, fluid flow through a lift fan shroud is enhanced by providing additional thrust via pulsed injection of detonation waves. The use of pulse detonation injection devices can significantly reduce the weight, cost, and complexity of a lift fan system and its associated components while still providing additional adequate thrust.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION

Figure 1:
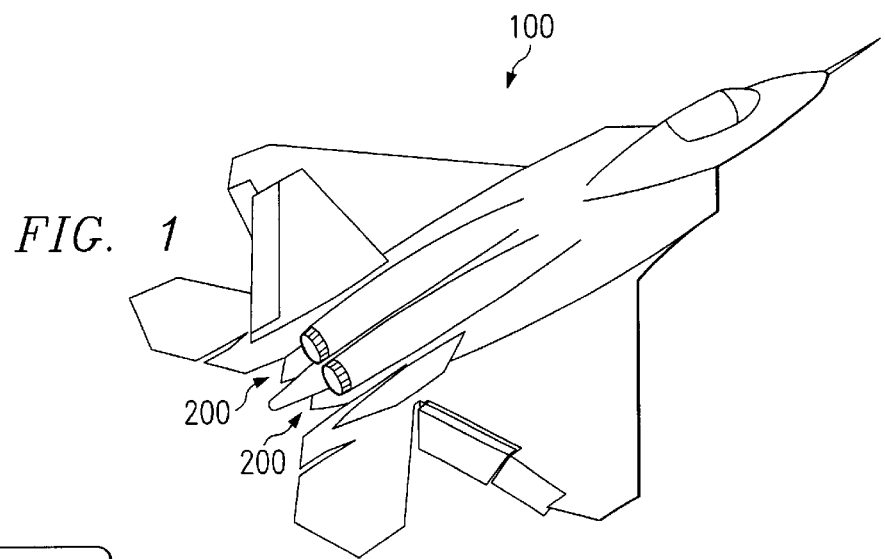
FIG. 1 is a perspective view of an aircraft having a pair of jet engines with exhaust nozzles, in which the flow through the nozzles is controlled by pulsed detonation injection according to the teachings of the present invention.

FIG. 1 is a perspective view of an aircraft 100 having a pair of jet engines 200. In the illustrated embodiment, aircraft 100 is the Lockheed F-22 Raptor; however, aircraft 100 may be any suitable aircraft or other machine employing one or more jet engines, such as jet engines 200.

Jet engine 200, which is described more fully below in conjunction with FIG. 2, creates thrust for aircraft 100 by directing a high-energy fluid flow from an exhaust nozzle. To change the speed or direction of aircraft 100, the thrust is either changed in magnitude or direction. There are various ways to accomplish this alteration of the thrust. One such way is to use pulsed detonation injection, as depicted below in FIGS. 2 and 3.

Figure 2:
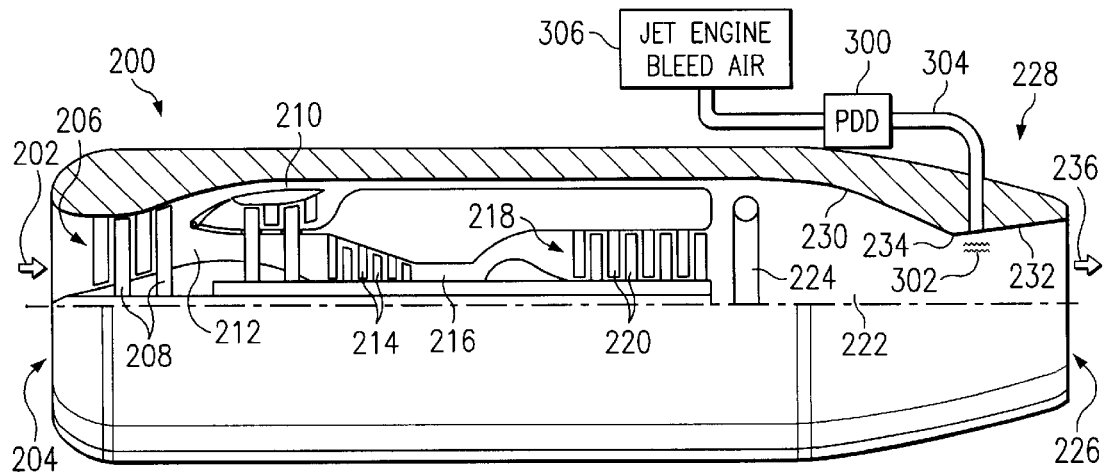
FIG. 2 is an elevation view, in partial cross-section, of an jet engine of FIG. 1.

FIG. 2 is an elevation view, in partial cross section, of jet engine 200. A fluid flow 202 of air enters jet engine 200 through intake 204. Fan section 206, comprised of a plurality of rotating fan blades 208, pushes fluid flow 202 into bypass section 210 and compressor section 212. Compressor section 212 is comprised of a plurality of compressor blades 214, which compress flow 202 into combustion chamber 216. Fuel is mixed with fluid flow 202 in combustion chamber 216 and ignited, thereby adding energy to fluid flow 202, resulting in an increased pressure and temperature of fluid flow 202 in combustion chamber 216. Pressure within combustion chamber 216 forces fluid flow 202 into turbine section 218, which is comprised of a plurality of turbine blades 220. Turbine section 218 removes some energy from fluid flow 202 to power compressor section 212 and fan section 206. Fluid flow 202 then passes into exhaust chamber 222, where it combines with the flow from bypass section 210. An afterburner 224 may provide additional fuel that can be ignited to increase the energy of fluid flow 202. Fluid flow 202 is then expelled from engine 200 through exit 226 as an exhaust flow. A nozzle 228 cooperates with exit 226 to accept fluid flow 202 from exhaust chamber 222 and to accelerate fluid flow 202 to higher velocities, typically supersonic velocities.

Nozzle 228 includes a converging portion 230, a diverging portion 232 downstream of converging portion 230, and a throat 234 coupling converging portion 230 and diverging portion 232. Typically, as fluid flow 202 passes through throat 234 of nozzle 228, it expands and accelerates from subsonic to supersonic speeds, essentially translating the energy of an exhaust flow 236 from a pressure into a velocity. The energy level of the air in exhaust chamber 222 generally relates to the velocity of the air as it exits nozzle 228. The greater the velocity of a given mass flow of air exiting engine 200, the greater thrust created by engine 200. To change the thrust created by engine 200, the effective cross-sectional area of throat 234 of nozzle 228 must be changed. In addition, to change the direction of flight of aircraft 100, the thrust must be vectored somehow. One way of accomplishing this is to provide at least one pulse detonation device 300 that is operable to inject a plurality of detonation waves 302 in a pulsed manner, as described below in detail in conjunction with FIG. 3.

Figure 3:
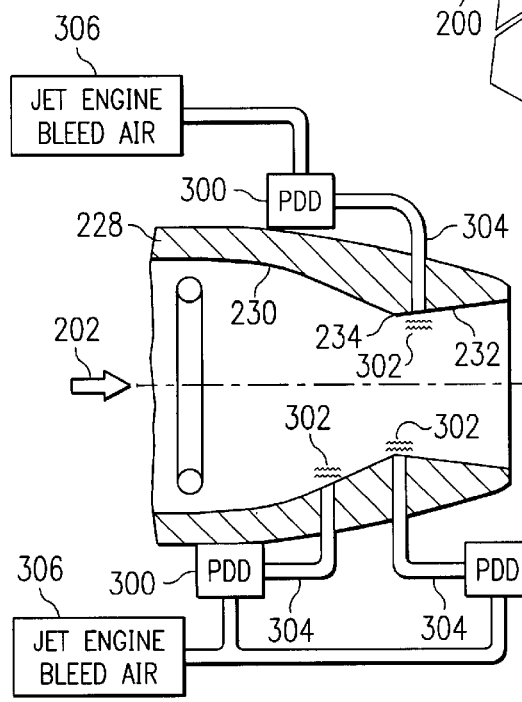
FIG. 3 is a cross-sectional view of the nozzle of the jet engine of FIGS. 1 and 2 illustrating pulsed detonation injection.

FIG. 3 is a cross-sectional view of nozzle 228 of jet engine 200 illustrating details of a system for altering fluid flow 202. FIG. 3 illustrates a plurality of pulse detonation devices 300 coupled to the interior of nozzle 228 via a plurality of ports 304 located in a wall 306 of nozzle 228. According to the teachings of the present invention, pulse detonation device 300 is operable to inject detonation waves 302 in a pulsed manner through port 304 and into fluid flow 202 to alter fluid flow 202.

Nozzle 228, although depicted in FIGS. 2 and 3 as a fixed geometry nozzle having a circular cross-section, may be any suitably shaped nozzle having either a fixed or variable geometry. Nozzle 228 may be formed from a suitable material and may be formed with any suitable wall thickness. Again, the function of nozzle 228 is to expand and accelerate fluid flow 202 form subsonic to supersonic speeds so that thrust may be created for aircraft 100.

Pulse detonation device 300 may be any suitable device that creates detonation waves in a pulsed manner. One example of pulse detonation device 300 is described in U.S. Pat. No. 5,473,885 issued to Hunter, Jr. et al., which is herein incorporated by reference. In a particular embodiment, pulse detonation devices 300 are coupled to a processor operable to execute software instructions to control the effective cross-sectional area of throat 234 of nozzle 228 over a range of operating conditions. Because pulse detonation devices, in general, benefit from high pressure air feeds, pulse detonation device 300 may, in some embodiments, receive bleed air from jet engine 200, as denoted by reference numeral 306. This bleed air may come from any suitable section of jet engine 200, such as compressor section 212.

Detonation waves 302 are very powerful waves that move extremely fast. Detonation waves 302, which have a pressure ratio of approximately 20-to-1, may be pulsed at a predetermined frequency, such as between approximately 100 hertz and approximately 1000 hertz, or may be pulsed at a variable frequency. Detonation waves 302 can theoretically travel inside port 304 at a speed approaching the Chapman-Jouget wave speed. Contrast this with a wave generated during a deflagration combustion process that travels at a speed of approximately 200 feet per second. Detonation waves 302 enter the interior of nozzle 228 followed by products of combustion, which typically are travelling at approximately 1000 feet per second. The products of combustion may burn fuel rich, if desired. As described above, detonation waves 302 are injected into the interior of nozzle 228 by utilizing ports 304. The increased energy (momentum and enthalpy) associated with pulsed detonation injection is believed to be an improvement over prior systems for efficiently controlling the cross flow.

Ports 304 are any suitable ports formed in wall 306 of nozzle 228 to transport detonation waves 302 created by pulse detonation device 300. Ports 304 are angled with respect to fluid flow 202 at the exit of port 304. As illustrated in FIG. 3, ports 304 are shown to be perpendicular to fluid flow 202; however, ports 304 may be angled opposing fluid flow 202 or coinciding with fluid flow 202. Ports 304 may be located anywhere circumferentially or longitudinally in nozzle 228. For example, as shown in FIG. 3, one port 304 is located in converging section 230, one is located at throat 234, and one is located in diverging portion 232. In one embodiment, ports 304 are proximate throat 234 such that detonation waves 302 are operable to vary the effective cross-sectional area of throat 234 within nozzle 228. In another embodiment, at least one port 304 provides an asymmetric cross-flow field in order to vector fluid flow 202 through nozzle 228. Ports 304 may be positioned such that the pulsed detonation waves 302 simultaneously throttle and vector fluid flow 202. In an embodiment where the pulsed detonation waves 302 throttle fluid flow 202 by decreasing the effective cross-sectional area of throat 234, the pulsed detonation waves 302 may control a temperature, a pressure, or a mass flow of fluid flow 202.

Figure 4:
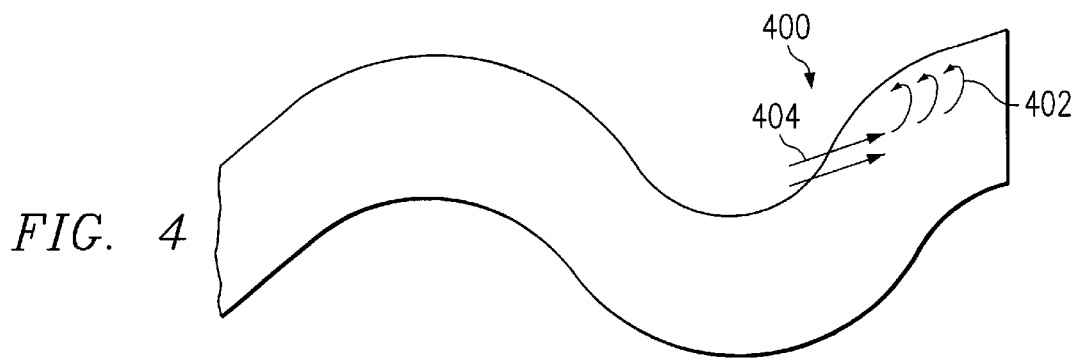
FIG. 4 is a schematic view of a curved duct illustrating the use of pulsed detonation injection to control strong adverse secondary flows and flow separation according to one embodiment of the present invention.

FIG. 4 is a schematic view of a curved duct 400 illustrating the use of pulse detonation injection to control flow separation or one or more adverse secondary flows denoted by reference numeral 402. The schematic shown in FIG. 4 generally shows a cross-section of curved duct 400. Arrows 404 depict the location and/or direction of pulsed detonation waves 302 to control fluid flow through curved duct 400, such as by combating the effects of flow separation and adverse secondary flow. The technical advantage of using pulse detonation injection to control fluid flow through a curved duct is that the fluid flow will be more uniform and less turbulent, which will enhance the effectiveness of the fluid flowing through curved duct 400. Although a particular curved shape is shown in FIG. 4 for a curved duct 400, other suitable curved ducts that produce strong flow separations and adverse secondary flow are contemplated by the present invention.

Figure 5:
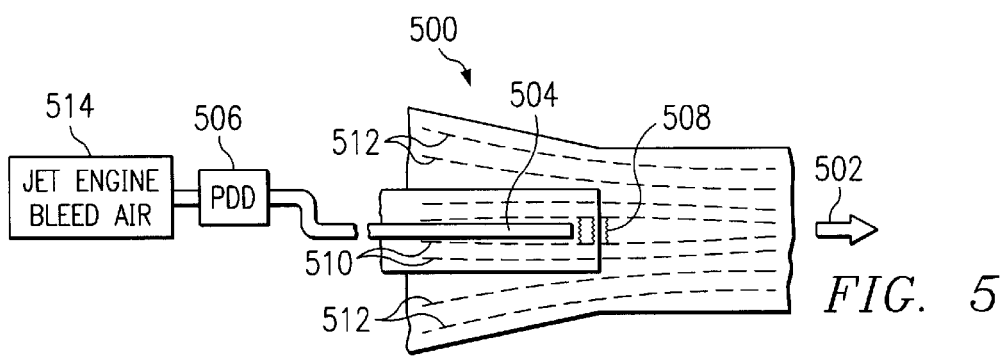
FIG. 5 is a cross-section view of an ejector, in which pulsed detonation injection is used to control air flow through the ejector.

FIG. 5 depicts a cross-sectional view of an ejector 500, in which pulse detonation injection is used to control airflow 502 through ejector 500. FIG. 5 shows a conduit 504 coupled to a pulse detonation device 506 that injects detonation waves 508 into a primary flow 510. The high energy and velocity of detonation waves 508 enhances the velocity and entrainment of secondary injected fluid flow 512 as shown. A technical advantage of using pulsed detonation injection in an injector 500 is that the efficiency of the injector is greatly enhanced. Because pulse detonation devices, in general, benefit from high pressure air feeds, pulse detonation device 506 may, in some embodiments, receive bleed air from jet engine 200, as denoted by reference numeral 514.

Figure 6:
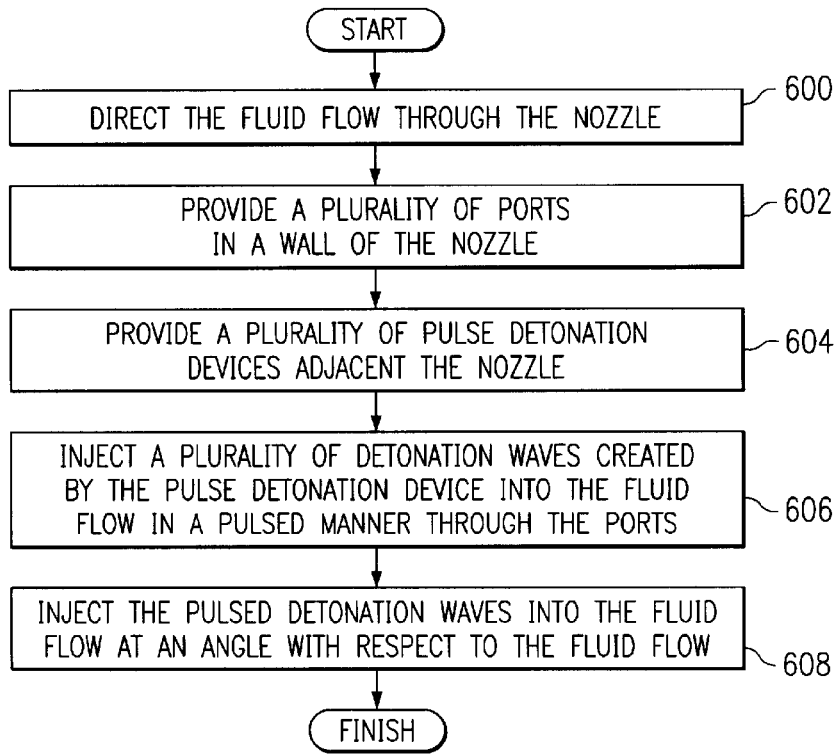
FIG. 6 is a flowchart illustrating one method of controlling flow of fluid through a nozzle using pulsed detonation injection.

FIG. 6 is a flowchart illustrating one method of controlling fluid flow 202 through nozzle 228 using pulse detonation injection. The method begins at step 600 where fluid flow 208 is directed through nozzle 228. A plurality of ports 304 are provided in wall 306 of nozzle 228 at step 602. A plurality of pulse detonation devices 300 are provided adjacent nozzle 228 at step 604 for the purpose of injecting a plurality of detonation waves 302 into fluid flow 202 in a pulsed manner through ports 304, as illustrated by step 606. Air is supplied to the pulse detonation devices 300 by jet engine compressor stage bleed, engine fan stage bleed, or ambient air via an auxiliary inlet. The pulsed detonation waves 302 are injected, at step 608, at an angle with respect to fluid flow 202, thereby having the effect of altering fluid flow 202. This ends the method as described in FIG. 6.

Figure 7:
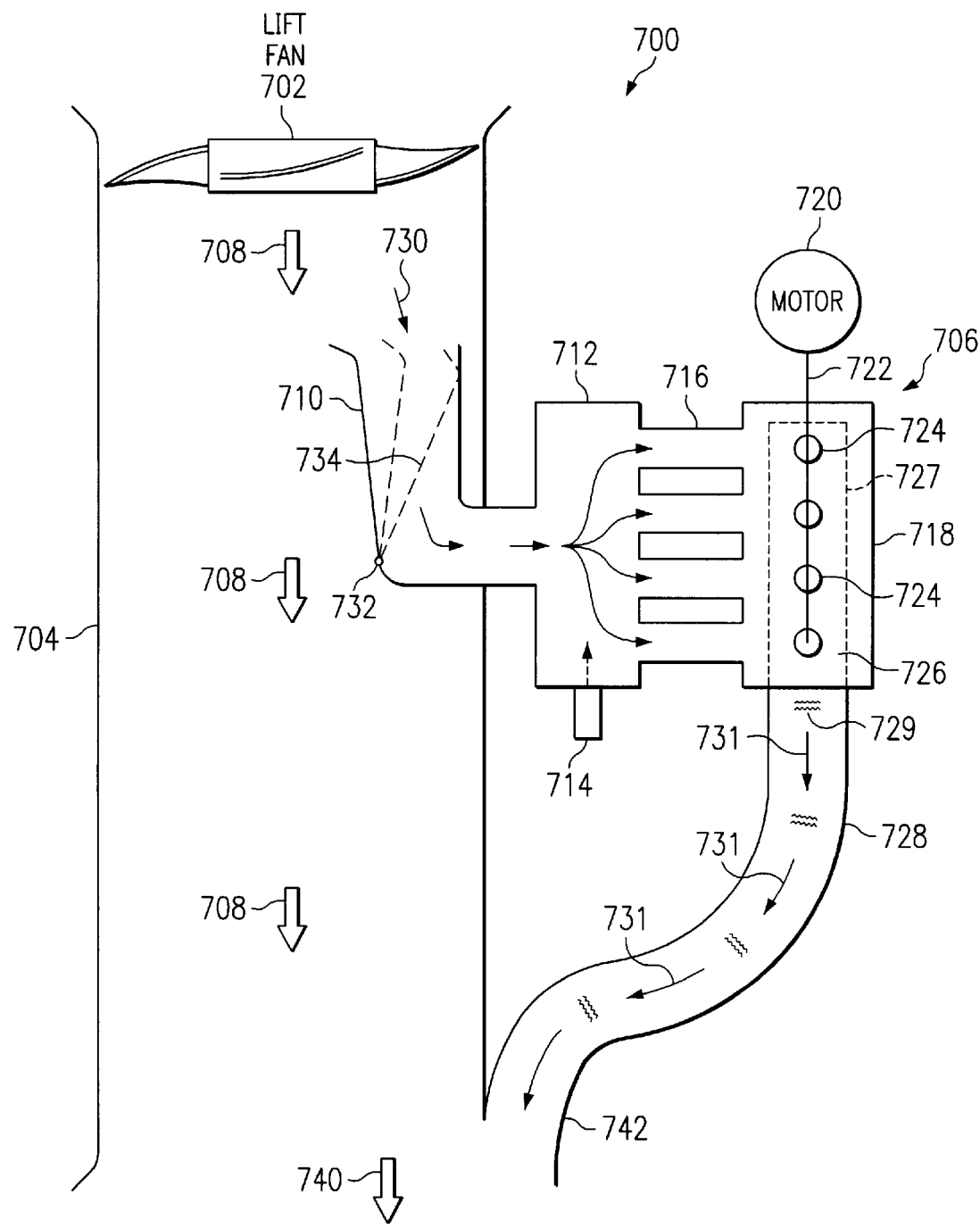
FIG. 7 is a schematic view of a lift fan system illustrating the use of pulsed detonation injection to provide additional thrust according to one embodiment of the present invention.

FIG. 7 is a schematic view of a lift fan system 700 illustrating the use of pulsed detonation injection to provide additional thrust according to one embodiment of the present invention. Lift fan system 700 is described herein as being part of aircraft 100; however, lift fan system 700 may be included with other suitable aircraft or machines requiring thrust. Generally, lift fan system 700 includes a lift fan 702 disposed within a shroud 704. According to the teachings of the present invention, lift fan system 700 also includes a pulsed detonation injection device 706 adjacent thereto to provide pulse detonation waves for additional thrust, as described in more detail below.

Lift fan 702, which may be any suitable fan, is typically driven by a shaft coupled to a jet engine of an aircraft, such as jet engine 200 of aircraft 100. The rotation of lift fan 702 produces high pressure air that travels downward through shroud 704 as denoted by arrow 708. Shroud 704 is typically semi-rectangular in shape; however, shroud 704 may be round or other suitable shape. Shroud 704 also typically extends the full height of aircraft 100. Both lift fan 702 and shroud 704 may be formed from any suitable material.

In the illustrated embodiment, pulsed detonation injection system 706 includes a throttle valve 710, a throttle body 712, a fuel injector 714, a manifold 716, a valve assembly 718, a motor 720 driving a cam 722, a plurality of valves 724, an igniter 726, a detonation chamber 727, and a pulsed detonation tube 728. Pulsed detonation injection system 706 functions to generate pulsed detonation waves to provide additional thrust to lift fan system 700. The components of pulsed detonation injection system 706 illustrated in FIG. 7 are only one of many ways that detonation waves may be generated. Hence, other suitable pulsed detonation injection systems are contemplated by the present invention.

Throttle valve 710 is any suitable valve operable to capture a portion of high pressure air from lift fan 702, as denoted by arrow 730. Throttle valve 710 may be coupled to a pivot 732 so that the amount of portion 730 can be controlled. In addition, throttle valve 710 may be closed as denoted by dashed line 734 if pulse detonation injection is not desired.

Throttle body 712 is any suitable chamber that accepts the high pressure air captured by throttle valve 710. Throttle body 712, in one embodiment, is rectangular in shape; however, throttle body 712 may be any suitable shape. Coupled to throttle body 712 is fuel injector 714 for the purpose of injecting fuel into throttle body 712. Fuel injector 714 is any suitable fuel injector that injects fuel into throttle body 712 to create a fuel-air mixture. The injected fuel may be a special super fuel, such as acetylene, or may be other fuels suitable to obtain the required detonation wave strength.

Manifold 716 is any suitably shaped conduit, or conduits, for transporting the fuel-air mixture in throttle body 712 to valve assembly 718. Valve assembly 718 is any suitable valving system that controls the injection of fuel-air mixture from manifold 716 into detonation chamber 727. In the illustrated embodiment, valve assembly 718 includes valves 724 that are opened by cam 722, which is driven by motor 720.

Valves 724 are any suitable valves, such as intake valves in an automobile, that allow fuel-air mixture from manifold 716 to enter detonation chamber 727. There may be any suitable number of valves 724. Valves 724 are driven by cam 722, which is any suitably shaped cam that operates to open and close all valves 724 at the same time in a very rapid manner. Motor 720 is any suitable motor operable to drive cam 722. Cam 722 may be driven in other suitable manners, such as by pneumatic, hydraulic, or electrical means.

Detonation chamber 727 is any suitably shaped chamber in which detonation waves are generated. In the illustrated embodiment, detonation chamber 727 is rectangularly shaped so that it may couple to valve assembly 718. Detonation chamber 727 may be coupled to valve assembly 718 in any suitable manner, such as by bolting. Igniter 726 is coupled to detonation chamber 727 is any suitable manner and is operable to facilitate the combustion of the fuel-air mixture in detonation chamber 727. Igniter 726 is any suitable igniter, such as a spark plug. The detonation causes a plurality of detonation waves 729 to travel down through detonation tube 728, as denoted by arrows 731. Detonation tube 728 is any suitably shaped conduit that transports generated detonation waves 729. Detonation waves 729, which are very powerful waves, provide additional thrust to the thrust generated by the high pressure air 708. This additional thrust gives lift fan system 700 extra lift for aircraft 100.

In operation, portion 730 of high pressure air 708 is captured by throttle valve 710 and enters throttle body 712. Fuel is then injected into throttle body 712 to create a fuel-air mixture in throttle body 712. Thereafter, the fuel-air mixture travels through one or more conduits of manifold 716 to valve assembly 718. The fuel-air mixture is stored in manifold 716 until valves 724 are opened simultaneously by cam 722 driven by motor 720. Valves 724 allow some of the fuel-air mixture to enter into detonation chamber 727 where igniter 726 facilitates the combustion of the fuel-air mixture, thereby generating detonation waves 729. Detonation waves 729 then travel through detonation tube 728 until they combine with the high pressure air 708 in shroud 704 to provide additional thrust to lift fan assembly 700.

Because valves 724 open and close in a very rapid manner, detonation waves 729 are generated in a pulsed manner. Detonation waves 729 may be pulsed at any suitable frequency. Because of the high heat that is generated during the generation of detonation waves 729, cooling of detonation tube 728 may be required. If required, then this cooling may be accomplished in any suitable manner.

The combined thrust that exits shroud 704 as denoted by reference numeral 740 is shown in FIG. 7 to be pointing downward. However, shroud 704 and an end 742 of detonation tube 728 may have the ability to swivel or rotate in any suitable direction to provided thrust 740 in any suitable direction. Accordingly, shroud 704 and detonation tube 728 may be coupled in any suitable manner. An important consideration in coupling shroud 704 and detonation tube 728 is that pulse detonation system 706 be close to shroud 704 so that detonation tube 728 will be as straight as possible to avoid any turbulent flow within detonation tube 728. This also simplifies the coupling of shroud 704 and detonation tube 728. If a purge system is required, some of the engine high pressure fan air may be used, where some of the valves would be modified appropriately to purge the hot products in detonation tube 728 before re-admission of the fuel-air mixture.

Although embodiments of the invention and their advantages are described in detail, a person skilled in the art could make various alterations, additions, and omissions without departing from the spirit and scope of the present invention as defined by the appended claims.

What is claimed is:

1. A system for altering a fluid flow, comprising:
   a nozzle having a fluid flow and comprising a converging portion, a diverging portion downstream of the converging portion, and a throat coupling the converging portion to the diverging portion;
   at least one port located in a wall of the nozzle and angled with respect to the fluid flow; and
   at least one pulse detonation device operable to inject a plurality of detonation waves in a pulsed manner through the port and into the fluid flow, the pulsed detonation waves operable to alter the fluid flow.

2. The system of claim 1, wherein the at least one port comprises a plurality of ports, the ports positioned proximate the throat such that the detonation waves operate to vary the effective cross-sectional area of the throat within the nozzle.

3. The system of claim 1, wherein the at least one port is adapted to provide an asymmetric cross flow field in order to vector the fluid flow through the nozzle.

4. The system of claim 1, wherein the at least one port comprises a plurality of ports, the ports individually positioned such that the pulsed detonation waves simultaneously throttle and vector the fluid flow.

5. The system of claim 1, wherein the at least one pulse detonation device pulses the detonation waves at a predetermined frequency.

6. The system of claim 5, wherein the predetermined frequency is within a range of approximately 100 hertz to approximately 1000 hertz.

7. The system of claim 1, wherein the detonation waves travel inside the port at a speed approaching the theoretical Chapman-Jouguet wave speed.

8. The system of claim 1, wherein the at least one pulse detonation device is operable to inject the plurality of detonation waves in a pulsed manner through the port and into the fluid flow to throttle the fluid flow by decreasing the effective cross-sectional area of the throat to control a temperature of the fluid flow.

9. The system of claim 1, wherein the at least one pulse detonation device is operable to inject the plurality of detonation waves in a pulsed manner through the port and into the fluid flow to throttle the fluid flow by decreasing the effective cross-sectional area of the throat to control a pressure of the fluid flow.

10. The system of claim 1, wherein the at least one pulse detonation device is operable to inject the plurality of detonation waves in a pulsed manner through the port and into the fluid flow to throttle the fluid flow by decreasing the effective cross-sectional area of the throat to control a mass flow of the fluid flow.

11. The system of claim 1, wherein the nozzle is selected from the group consisting of a fixed geometry nozzle and a variable geometry nozzle.

12. The system of claim 1, wherein the nozzle is integral to a jet engine onboard an aircraft.

13. The system of claim 1, wherein the pulsed detonation wave is followed into the nozzle by a plurality of products of combustion that are fuel rich.

14. The system of claim 1, wherein the pulse detonation device further comprises a processor operable to execute software instructions to control the effective cross-sectional area of the throat of the nozzle over a range of operating conditions.

15. A system for altering a fluid flow, comprising:
    a nozzle integral to a jet engine onboard an aircraft, the nozzle having a fluid flow and comprising a converging portion, a diverging portion downstream of the converging portion, and a throat coupling the converging portion to the diverging portion;
    a plurality of ports located in a wall of the nozzle; and
    a plurality of pulse detonation devices operatively coupled to a respective port, each pulse detonation device operable to inject a plurality of detonation waves in a pulsed manner through its respective port and into the fluid flow in a direction that is non-parallel to the fluid flow.

16. The system of claim 15, wherein the ports are individually positioned to provide a symmetric cross flow field in order to vary the effective cross-sectional area of the throat within the nozzle.

17. The system of claim 15, wherein at least one port is adapted to provide an asymmetric cross flow field in order to vector the fluid flow through the nozzle.

18. The system of claim 15, wherein the ports are individually positioned such that the pulsed detonation waves simultaneously throttle and vector the fluid flow.

19. The system of claim 15, wherein the detonation waves are pulsed within a frequency range of approximately 100 hertz to approximately 1000 hertz.

20. The system of claim 15, wherein the detonation waves are pulsed at variable frequencies.

21. The system of claim 15, wherein the detonation waves travel inside the ports at a speed approaching the theoretical Chapman-Jouguet wave speed.

22. The system of claim 15, wherein the nozzle is selected from the group consisting of a fixed geometry nozzle and a variable geometry nozzle.

23. The system of claim 15, wherein the pulsed detonation waves are followed into the nozzle by a plurality of products of combustion that are fuel rich.

24. The system of claim 15, wherein the pulse detonation devices are coupled to at least one processor operable to execute software instructions to control the effective cross-sectional area of the throat of the nozzle over a range of operating conditions.

* * * * *